US012576523B2

(12) United States Patent
Florence et al.

(10) Patent No.: US 12,576,523 B2
(45) Date of Patent: Mar. 17, 2026

(54) CONTROLLING ROBOTS USING MULTI-MODAL LANGUAGE MODELS

(71) Applicant: Google LLC, Mountain View, CA (US)

(72) Inventors: Peter Raymond Florence, San Francisco, CA (US); Danny Michael Driess, Berlin (DE); Igor Mordatch, Oakland, CA (US); Andy Zeng, Stanford, CA (US); Seyed Mohammad Mehdi Sajjadi, Berlin (DE); Klaus Greff, Berlin (DE)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/008,421

(22) Filed: Jan. 2, 2025

(65) Prior Publication Data
US 2025/0144795 A1 May 8, 2025

Related U.S. Application Data

(63) Continuation of application No. PCT/US2024/014283, filed on Feb. 2, 2024.

(60) Provisional application No. 63/443,002, filed on Feb. 2, 2023.

(51) Int. Cl.
*B25J 9/16* (2006.01)

(52) U.S. Cl.
CPC ................................. *B25J 9/1658* (2013.01)

(58) Field of Classification Search
CPC .................................................. B25J 9/1658
See application file for complete search history.

(56) References Cited

U.S. PATENT DOCUMENTS

| | | |
|---|---|---|
| 11,354,509 B2 | 6/2022 | Hermann et al. |
| 2023/0178076 A1* | 6/2023 | Abramson ............. G06N 3/084 |
| | | 704/232 |

OTHER PUBLICATIONS

Li, Shuang, et al. "Pre-Trained Language Models for Interactive Decision-Making." (2022) (Year: 2022).*
Jiang, Yunfan, et al. "Vima: General robot manipulation with multimodal prompts." (2022) (Year: 2022).*

(Continued)

*Primary Examiner* — Adam R Mott
*Assistant Examiner* — Matthew C Gammon
(74) *Attorney, Agent, or Firm* — Fish & Richardson P.C.

(57) ABSTRACT

Methods, systems, and apparatus, including computer programs encoded on a computer storage medium, for controlling an agent interacting with an environment. In one aspect, a method comprises: receiving one or more observations of an environment; receiving an input text sequence that describes a task to be performed by a robot in the environment; generating an encoded representation of the input text sequence in an embedding space; generating a corresponding encoded representation of each of the one or more observations in the embedding space; generating a sequence of input tokens that comprises the encoded representation of the input text sequence and the corresponding encoded representation of each observation; processing the sequence of input tokens using a language model neural network to generate an output text sequence that comprises high-level natural language instructions; and determining, from the high-level natural language instructions, one or more actions to be performed by the robot.

20 Claims, 8 Drawing Sheets

(56) References Cited

OTHER PUBLICATIONS

Guhur, Pierre-Louis, et al. "Instruction-driven history-aware policies for robotic manipulations." (2022) (Year: 2022).*

Sajjadi, Mehdi SM, et al. "Object scene representation transformer." (2022) (Year: 2022).*

Tsimpoukelli, Maria, et al. "Multimodal few-shot learning with frozen language models." (2021) (Year: 2021).*

Jeet. "One Hot encoding of text data in Natural Language Processing." Medium, Aug. 14, 2020, medium.com/analytics-vidhya/one-hot-encoding-of-text-data-in-natural-language-processing-2242fefb2148 (Year: 2020).*

Ahn et al., "Do as I can, not as I say: Grounding language in robotic affordances," CoRR, Submitted on Aug. 16, 2022, arXiv:2204.01691v2, pp. 1-34.

Alayrac et al., "Flamingo: a visual language model for few-shot learning," CoRR, Submitted on Apr. 29, 2022, arXiv:2204.14198v1, pp. 1-66.

Alayrac et al., "Flamingo: a visual language model for few-shot learning," CoRR, Submitted on Nov. 15, 2022, arXiv:2204.14198v2, pp. 1-54.

Bommasani et al., "On the Opportunities and Risks of Foundation Models," CoRR, Submitted on Aug. 18, 2021, arXiv:2108.07258v2, pp. 1-212.

Brohan et al., "RT-1: Robotics Transformer for Real-World Control at Scale", CoRR, Submitted on Dec. 13, 2022, arXiv:2212.06817v1, pp. 1-31.

Brown et al., "Language models are few-shot learners," Paper, Presented at the 34th Conference on Neural Information Processing Systems, Virtual Event, Dec. 6-12, 2020; Advances in Neural Information Processing Systems 33, Jul. 2021, pp. 1-25.

Changpinyo et al., "All You May Need for VQA are Image Captions," CoRR, Submitted on May 4, 2022, arXiv:2205.01883v1, 17 pages.

Chen et al., "Evaluating large language models trained on code," CoRR, Submitted on Jul. 7, 2021, arXiv:2107.03374v1, 35 pages.

Chen et al., "Microsoft COCO Captions: Data Collection and Evaluation Server," CoRR, Submitted on Apr. 3, 2015, arXiv:1504.00325v2, pp. 1-7.

Chen et al., "PaLI: A jointly-scaled multilingual language-image model," CoRR, Submitted on Sep. 14, 2022, arXiv:2209.06794v1, pp. 1-30.

Chen et al., "PaLI: A jointly-scaled multilingual language-image model," CoRR, Submitted on Sep. 16, 2022, arXiv:2209.06794v2, pp. 1-30.

Chen et al., "Pix2seq: A language modeling framework for object detection," CoRR, Submitted on Sep. 22, 2021, arXiv:2109.10852v1, pp. 1-16.

Chowdhery et al., "PaLM: Scaling Language Modeling with Pathways," CoRR, Submitted on Oct. 5, 2020, arXiv:2204.02311v5, pp. 1-87.

Chowdhery et al., "PaLM: Scaling Language Modeling with Pathways," CoRR, Submitted on Sep. 29, 2020, arXiv:2204.02311v4, pp. 1-87.

Devlin et al., "BERT: Pre-training of Deep Bidirectional Transformers for Language Understanding," CoRR, Submitted on Oct. 11, 2018, arXiv:1810.04805v1, 14 pages.

Dosovitskiy et al., "An image is worth 16x16 words: Transformers for image recognition at scale," CoRR, Submitted on Oct. 22, 2020, arXiv:2010.11929v1, pp. 1-21.

Driess et al., "Deep visual reasoning: Learning to predict action sequences for task and motion planning from an initial scene image," Paper, Presented at the Robotics: Science and Systems, Virtual Event, Jul. 12-16, 2020; Proceedings of the Robotics: Science and Systems, 2020, 10 pages.

Glaese et al., "Improving alignment of dialogue agents via targeted human judgements," CoRR, Submitted on Sep. 28, 2022, arXiv:2209.14375v1, pp. 1-77.

Goyal et al., "Making the V in VQA matter: Elevating the role of image understanding in Visual Question Answering," Paper, Pre-sented at the Conference on Computer Vision and Pattern Recognition, Honolulu, HI, Jul. 21-26, 2017; Proceedings of the Conference on Computer Vision and Pattern Recognition, Feb. 2018, pp. 6904-6913.

Guhur et al., "Instruction-driven history-aware policies for robotic manipulations," CoRR, Submitted on Dec. 17, 2022, arXiv:2209.04899v3, pp. 1-19.

Guhur et al., "Instruction-driven history-aware policies for robotic manipulations," CoRR, Submitted on Sep. 22, 2022, arXiv:2209.04899v2, pp. 1-25.

Hu et al., "Scaling up vision-language pre-training for image captioning," Paper, Presented at the Conference on Computer Vision and Pattern Recognition, New Orleans, Jun. 18-24, 2022; Proceedings of the Conference on Computer Vision and Pattern Recognition, Jan. 2023, pp. 17980-17989.

Huang et al., "Inner Monologue: Embodied Reasoning through Planning with Language Models," CoRR, Submitted on Jul. 12, 2022, arXiv:2207.05608v1, pp. 1-25.

Huang et al., "Language models as zero-shot planners: Extracting actionable knowledge for embodied agents," CoRR, Submitted on Jan. 18, 2022, arXiv:2201.07207v1, pp. 1-32.

International Search Report and Written Opinion in International Appln. No. PCT/US2024/014283, mailed on May 6, 2024, 14 pages.

Jang et al., "BC-Z: Zero-shot task generalization with robotic imitation learning," Paper, Presented at the Conference on Robot Learning, London, UK, Nov. 8-11, 2021; Proceedings of the 5th Conference on Robot Learning, 2022, PMLR 164:1-12.

Jiang et al., "VIMA: General Robot Manipulation with Multimodal Prompts," CoRR, Submitted on Oct. 6, 2022, arXiv:2210.03094v1, pp. 1-40.

Kalashnikov et al., "Scalable deep reinforcement learning for vision-based robotic manipulation," Paper, Presented at the Conference on Robot Learning, Zurich, Switzerland, Oct. 29-31, 2018; Proceedings of the 2nd Conference on Robot Learning, 2018, PMLR 87:1-23.

Kojima et al., "Large language models are zero-shot reasoners," CoRR, Submitted on Jun. 9, 2022, arXiv:2205.11916v2, pp. 1-40.

Kojima et al., "Large language models are zero-shot reasoners," CoRR, Submitted on May 24, 2022, arXiv:2205.11916v1, pp. 1-36.

Lester et al., "The Power of Scale for Parameter-Efficient Prompt Tuning," CoRR, Submitted on Sep. 2, 2021, arXiv:2104.08691v2, 15 pages.

Lewkowycz et al., "Solving quantitative reasoning problems with language models," CoRR, Submitted on Jul. 1, 2022, arXiv:2206.14858v2, pp. 1-54.

Li et al., "Pre-trained language models for interactive decision-making," CoRR, Submitted on Oct. 29, 2022, arXiv:2202.01771v4, pp. 1-23.

Li et al., "TrOCR: Transformer-based Optical Character Recognition with Pre-trained Models," CoRR, Submitted on Sep. 25, 2021, arXiv:2109.10282v3, 10 pages.

Liu et al., "Instruction-Following Agents with Jointly Pre-Trained Vision-Language Models," CoRR, Submitted on Oct. 24, 2022, arXiv:2210.13431v1, pp. 1-15.

Lynch et al., "Grounding Language in Play," CoRR, Submitted on May 15, 2020, arXiv:2005.07648v1, pp. 1-23.

Lynch et al., "Interactive Language: Talking to Robots in Real Time," CoRR, Submitted on Oct. 12, 2022, arXiv:2210.06407v1, 11 pages.

Lynch et al., "Language Conditioned Imitation Learning over Unstructured Data," CoRR, Submitted on Jul. 7, 2021, arXiv:2005.07648v2, 18 pages.

Marino et al., "OK-VQA: A Visual Question Answering Benchmark Requiring External Knowledge," Paper, Presented at the Conference on Computer Vision and Pattern Recognition, Long Beach, CA, Jun. 15-20, 2019; Proceedings of the Conference on Computer Vision and Pattern Recognition, Feb. 2020, pp. 3195-3204.

Nair et al., "Learning language-conditioned robot behavior from offline data and crowd-sourced annotation," Paper, Presented at the Conference on Robot Learning, London, UK, Nov. 8-11, 2021; Proceedings of the 5th Conference on Robot Learning, 2022, PMLR 164:1-13.

(56) References Cited

OTHER PUBLICATIONS

Piergiovanni et al., "Pre-training image-language transformers for open-vocabulary tasks," CoRR, Submitted on Sep. 9, 2022, arXiv:2209. 04372v1, 5 pages.

Polu et al., "Formal Mathematics Statement Curriculum Learning," CoRR, Submitted on Feb. 3, 2022, arXiv:2202.01344v1, 26 pages.

Reed et al., "A Generalist Agent," CoRR, Submitted on May 19, 2022, arXiv:2205.06175v2, pp. 1-40.

Reed et al., "A Generalist Agent," CoRR, Submitted on Nov. 11, 2022, arXiv:2205.06175v3, pp. 1-42.

Ryoo et al., "TokenLearner: What can 8 learned tokens do for images and videos?," CoRR, Submitted on Dec. 7, 2021, arXiv:2106. 11297v3, pp. 1-21.

Ryoo et al., "TokenLearner: What can 8 learned tokens do for images and videos?," CoRR, Submitted on Jun. 21, 2021, arXiv:2106. 11297v1, pp. 1-15.

Ryoo et al., "TokenLearner: What can 8 learned tokens do for images and videos?," CoRR, Submitted on Oct. 5, 2021, arXiv:2106. 11297v2, pp. 1-21.

Sajjadi et al., "Object Scene Representation Transformer," Paper, Presented at the 36th Conference on Neural Information Processing Systems, New Orleans, LA, Nov. 28-Dec. 9, 2022; Advances in Neural Information Processing Systems 35, Apr. 2023, pp. 1-13.

Sharma et al., "Conceptual Captions: A Cleaned, Hypernymed, Image Alt-text Dataset For Automatic Image Captioning," Paper, Presented at the Annual Meeting of the Association for Computational Linguistics, Melbourne, Australia, Jul. 15-20; Proceedings of the 56th Annual Meeting of the Association for Computational Linguistics (vol. 1: Long Papers), 2018, pp. 2556-2565.

Sharma et al., "Skill Induction and Planning with Latent Language," CoRR, Submitted on Oct. 4, 2021, arXiv:2110.01517v1, 13 pages.

Shridhar et al., "CLIPORT: What and Where Pathways for Robotic Manipulation," Paper, Presented at the Conference on Robot Learning, London, UK, Nov. 8-11, 2021; Proceedings of the 5th Conference on Robot Learning, 2022, PMLR 164:1-13.

Shridhar et al., "Perceiver-Actor: A Multi-Task Transformer for Robotic Manipulation," CoRR, Submitted on Nov. 11, 2022, arXiv:2209. 05451v2, pp. 1-28.

Silva et al., "LanCon-Learn: Learning With Language to Enable Generalization in Multi-Task Manipulation," IEEE Robotics and Automation Letters, Apr. 2022, 7(2):1-8.

Singh et al., "ProgPrompt: Generating situated robot task plans using large language models," Paper, Presented at the 36th Conference on Neural Information Processing Systems, New Orleans, LA, Nov. 28-Dec. 9, 2022; Autonomous Robots, Aug. 2023, 47:999-1012.

Tellex et al., "Robots that use language," Annual Review of Control, Robotics, and Autonomous Systems, May 2020, 3:25-55.

Thoppilan et al., "LaMDA: Language Models for Dialog Applications," CoRR, Submitted on Feb. 10, 2022, arXiv:2201.08239v3, pp. 1-47.

Tsimpoukelli et al., "Multimodal few-shot learning with frozen language models," Paper, Presented at the 35th Conference on Neural Information Processing Systems, Virtual Event, Dec. 6-14, 2021; Advances in Neural Information Processing Systems 34, May 2022, pp. 1-13.

Wei et al., "Chain of thought prompting elicits reasoning in large language models," CoRR, Submitted on Oct. 10, 2022, arXiv:2201. 11903v5, pp. 1-43.

Xiao et al., "Robotic Skill Acquisition via Instruction Augmentation with Vision-Language Models," CoRR, Submitted on Nov. 22, 2022, arXiv:2211.11736, pp. 1-20.

Zeng et al., "Socratic Models: Composing Zero-Shot Multimodal Reasoning with Language," CoRR, Submitted on May 27, 2022, arXiv:2204.00598v2, pp. 1-30.

Zhang et al., "Hierarchical Task Learning from Language Instructions with Unified Transformers and Self-Monitoring," CoRR, Submitted on Jun. 7, 2021, arXiv:2106.03427v1, 12 pages.

Zhou et al., "Unified Vision-Language Pre-Training for Image Captioning and VQA," Paper, Presented at the Conference on Artificial Intelligence, New York, NY, Feb. 7-12, 2020; Proceedings of the AAAI Conference on Artificial Intelligence, Apr. 2020, 34(7):13041-13049.

International Preliminary Report on Patentability in International Appln. No. PCT/US2024/014283, mailed on Aug. 14, 2025, 7 pages.

* cited by examiner

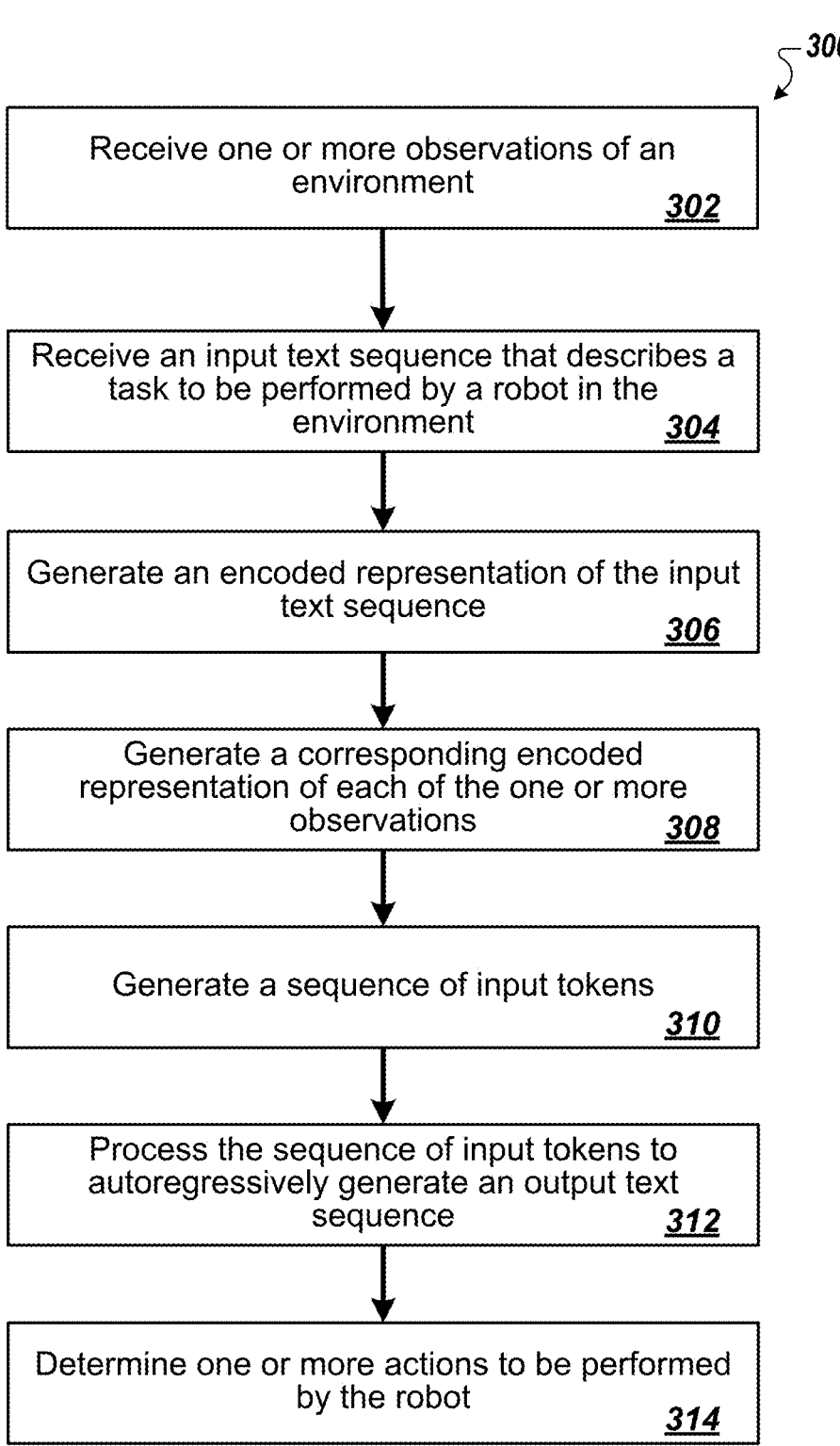

300

Receive one or more observations of an environment     302

Receive an input text sequence that describes a task to be performed by a robot in the environment     304

Generate an encoded representation of the input text sequence     306

Generate a corresponding encoded representation of each of the one or more observations     308

Generate a sequence of input tokens     310

Process the sequence of input tokens to autoregressively generate an output text sequence     312

Determine one or more actions to be performed by the robot     314

Obtain a set of training data

_402_

Train the learnable modules on the set of training data

_404_

Visual-conditioned Jokes + Few-shot prompting

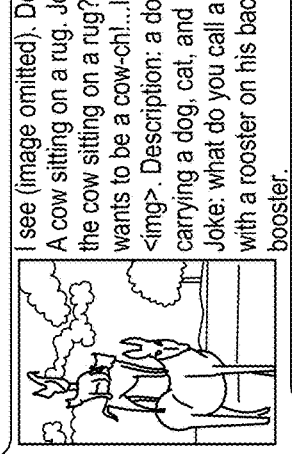

I see (image omitted). Description: A cow sitting on a rug. Joke: Why is the cow sitting on a rug? Because it wants to be a cow-ch!...I see <img>. Description: a donkey is carrying a dog, cat, and rooster. Joke: what do you call a donkey with a rooster on his back. A rooster booster.

Robot Visual Perception, Dialogue, and Planning

Robot: I am a robot operating in a kitchen. Given <img>, what do I see? a bowl of eggs, a bowl of flour, and a bowl of sugar...and a spatula...and a spoon...and a bag of flour...and a bag of sugar. When a human asks me to do a task, I will respond with the sequence of actions I would do to accomplish the task with only the items I see. Human: Use all of the ingredients you see to make a cake batter. 1. crack egg.2.put egg in bowl.3.put flour in bowl.4.put sugar in bowl.5.mix.6.put in pan.7.bake.8.eat.9.clean up.

Spatial Grounding

Given <img>. Q:What flavor is the doughnut on the right? Strawberry. Q: What flavor is the doughnut on the left? A blueberry

Robot Initiative

Given <img>. Q: If a robot wanted to be useful here, what steps should it take? A: clean table...pick up trash...pick up chairs...wipe chairs...put chairs down

Physical Prediction

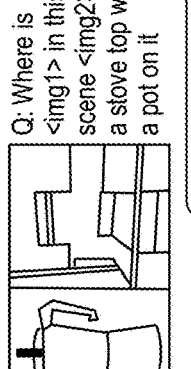

Given <img>. Q: What will the robot do next? A:fall.

Photo 1:<img1>. Photo 2:<img2>. Q: what is in Photo 1 but NOT in Photo 2? sunglasses. Photo 1:<img1>. Photo 2:<img2>. Q: what is in Photo 1 but NOT in Photo 2? A: Lets think step by step and explain. Photo 1 has sunglasses on top of folded clothes. Photo 2 does not have sunglasses on top of folded clothes. Therefore, sunglasses are in Photo 1 but not in Photo 2.

Zero-shot Multimodal Chain-of-Thought

Give <img>. Q: Can I go down this street on a bicycle, yes or no? A: Let's think step by step. 1. do not enter. 2. except bicycles. 3. do not entry except bicycles. 4. yes

Zero-shot: Multi-image Relationships

Q: Where is <img1> in this scene <img2>?A: a stove top with a pot on it

End-to-End Egocentric Q&A, Dialogue

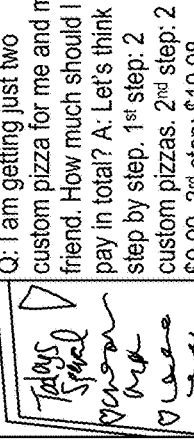

Photo 1, at 10:30 am: <img1>. Photo 2, at 12:45 pm: <img2>. Photo 3, at 3:45 pm: <img3>. Q: I forgot, what did I have for lunch, and what time was it? A: Let's think step by step. 1. you had a sandwich for lunch. 2. it was 12:45 pm.

OCR-free Math Reasoning

Given <img>. Q: I am getting just two custom pizza for me and my friend. How much should I pay in total? A: Let's think step by step. 1st step: 2 custom pizzas. 2nd step: 2 x $9.99. 3rd step: $19.98.

552
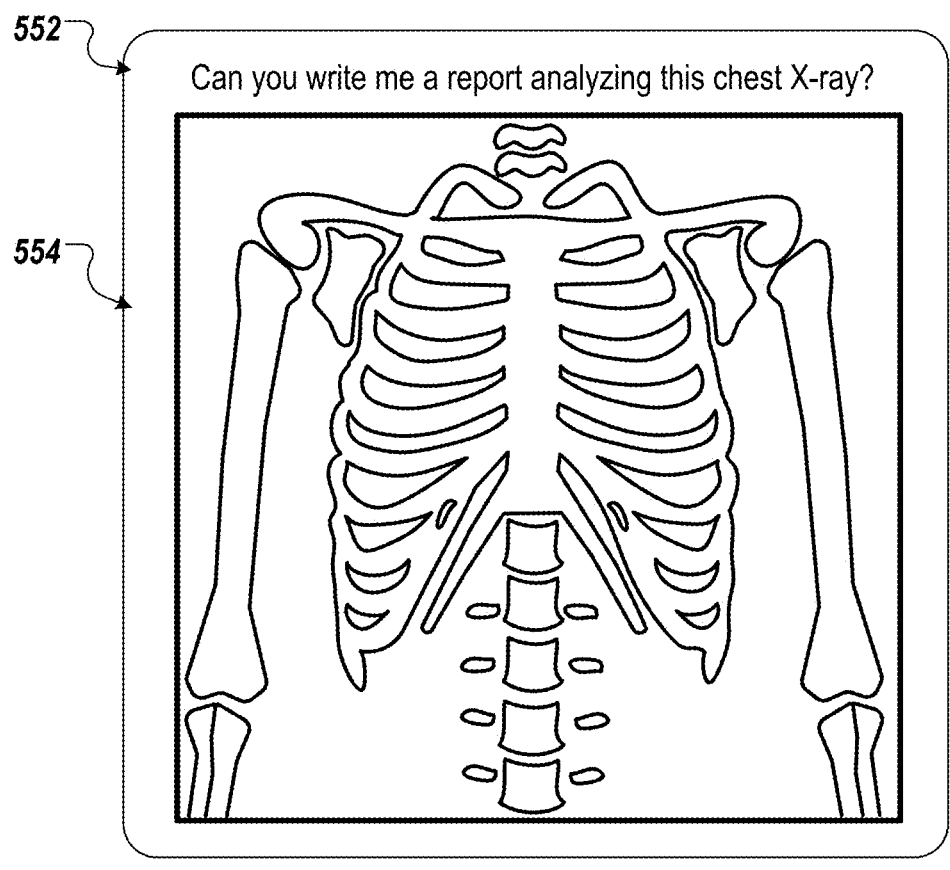
554
556
Findings:
- Device: None.
- Lungs: No pneumothorax. No substantial pleural effusion. Lungs appear clear.
- Cardiomediastinal: Normal heart size. Mediastinal contours within normal limits.
- Other: No acute skeletal abnormality
Impression:
No active disease seen in chest.
FIG. 5D

CONTROLLING ROBOTS USING MULTI-MODAL LANGUAGE MODELS

CROSS-REFERENCE TO RELATED APPLICATION

This application is a continuation of PCT Application Serial No. PCT/US2024/014283, filed on Feb. 2, 2024, which claims priority to U.S. Provisional Application No. 63/443,002, filed on Feb. 2, 2023. The disclosure of the prior applications is considered part of and is incorporated by reference in the disclosure of this application.

BACKGROUND

This specification relates to robotics planning using neural networks.

Robotics planning refers to scheduling the physical operations of robots in order to perform tasks. For example, a service robot (e.g., a home or domestic robot) that performs household tasks can be configured to retrieve household objects for human by first locating a drawer in which the object is kept, opening the drawer, picking the object, and bringing the object to a human. Each of these operations can themselves include multiple individual low-level actions by robot motors and actuators.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current value inputs of a respective set of parameters.

SUMMARY

This specification describes a system implemented as computer programs on one or more computers in one or more locations that generates, at each of multiple time steps, a plan for performing a task by an agent, e.g., a robot or another mechanical agent. The plan can specify a sequence of two or more actions, where each action is selected from a space of possible actions. The sequence of two or more actions can include a first action followed by a second action. At each time step, the system then causes the agent to perform the actions one after another in the order defined by plan, thereby controlling the agent to interact with an environment to perform the task.

The subject matter described in this specification can be implemented in particular embodiments so as to realize one or more of the following advantages.

A robotics planning system, as described in this specification, is a multi-modal robot control system that can generate plans for causing a robot to perform a particular task by processing system inputs that span multiple data modalities. The described robotics planning system combines the rich semantic knowledge learned by a language model neural network, e.g., a pre-trained language model neural network, with multi-modal prompts that link text and images to allow for generation of high quality plans from task descriptions in textual format, observation images, and possibly additional data from different sensor modalities. The robotics planning system allows a robot to be controlled by a user using natural language input, without being limited to particular predefined command words or phrases in the input.

The robotics planning system is broadly applicable to generate plans for a wide range of tasks that a robot may be configured to perform. Advantageously, since each system output is a plan that includes a sequence of multiple actions, controlling robots using the described robotics planning system enables more efficient use of computational resources (e.g., memory and computing power) by requiring fewer control iterations than conventional systems that control the robot to perform actions that are individually selected one after another over multiple control iterations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram of an example process for controlling an agent interacting with an environment.

FIG. 5B is an example illustration of additional tasks that can be performed by an encoder subsystem and a language model neural network.

FIG. 5D is an example illustration of performing a medical visual question answering task by an encoder subsystem and a language model neural network.

Like reference numbers and designations in the various drawings indicate like elements.

DETAILED DESCRIPTION

Figure 1:
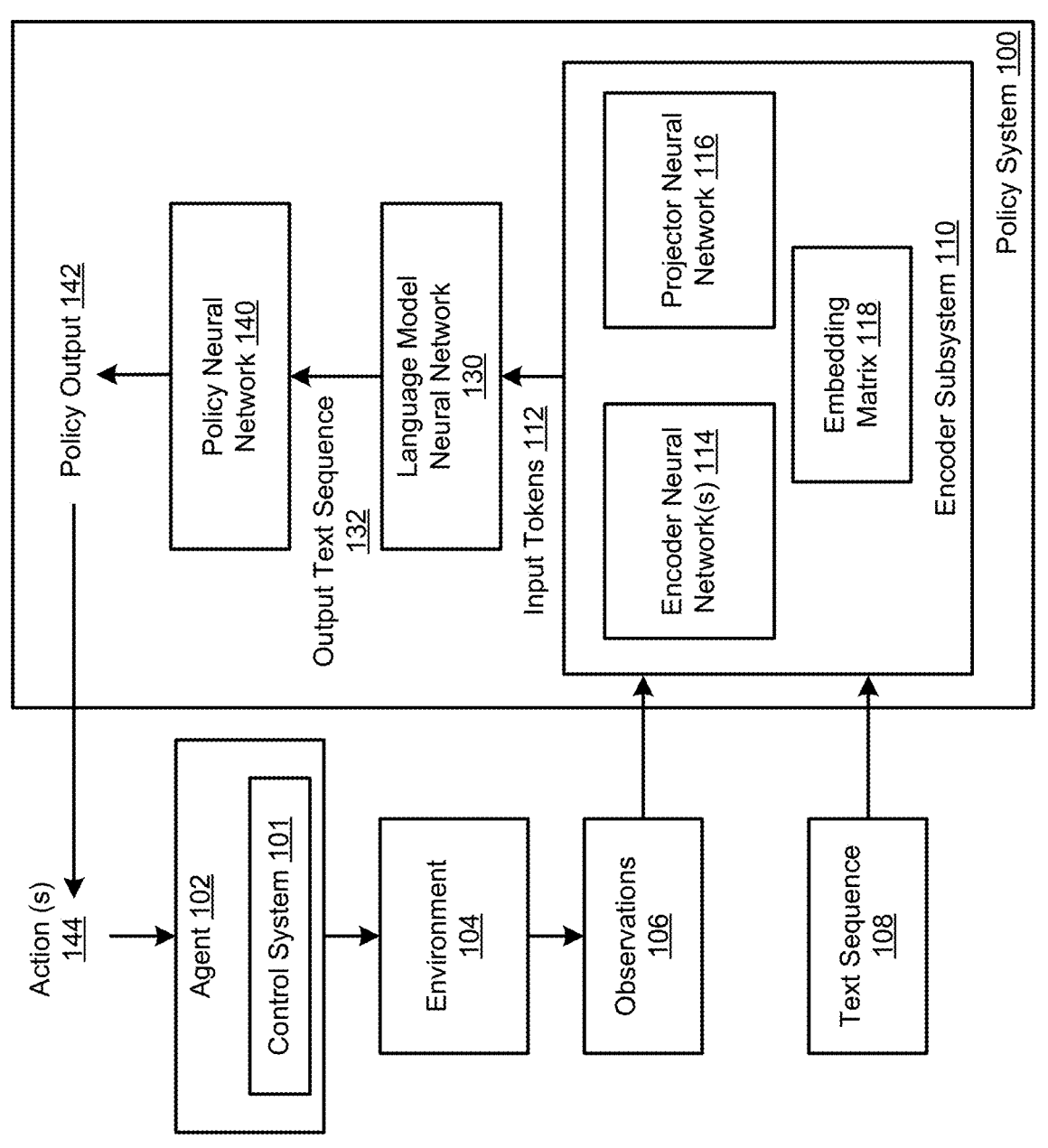
FIG. 1 shows an example policy system and an example control system.

FIG. 1 shows an example policy system 100 and an example control system 101. The policy system 100 and the control system 101 are examples of a system implemented as computer programs on one or more computers in one or more locations in which the systems, components, and techniques described below are implemented.

The policy system 100 and the control system 101 can control an agent 102, e.g., a robot, to accomplish any of a wide variety of tasks in the environment 104. To control the agent 102 that is interacting in the environment 104 to accomplish a task, the policy system 100 selects actions 144 to be performed by the agent 102, and the control system 101 then causes the agent 102 to perform the selected actions 144.

As a general example, the task can include one or more of, e.g., causing the agent to navigate to different locations in the environment which avoiding obstacle objects along the way, causing the agent to locate different objects, causing the agent to pick up different objects or to move different objects to one or more specified locations, and so on. To accomplish such a task, the agent 102 moves, e.g., navigates and/or changes its configuration, within the environment 104.

Typically, the control system 101 is local to the agent 102. For example, the control system 101 can be on-board the agent 102, e.g., can be implemented on one or more computers, a local workstation, or a local server having relatively small processing and memory resources that is on-board the agent 102, e.g., having limited processing power and/or a constrained memory space.

In some implementations, the policy system 100 is local to the agent 102. For example, like the control system 101, the policy system 100 can also be on-board the agent 102. Moreover, in some of these implementations, the policy system 100 can be a part of the control system 101 which causes the agent 102 to perform actions 144.

In other implementations, the policy system 100 is remote from the agent 102. For example, unlike the control system 101, the policy system 100 can be hosted within a data center, which can be a distributed computing system having hundreds or thousands of computers in one or more locations. That is, the control system 101 can receive data identifying the actions 144 from an external source, e.g., rather than generating such data on-board the agent 102.

In these implementations, the policy system 100 and the control system 101 can be connected by a data communication network, such as a local area network (LAN), a wide area network (WAN), the Internet, or a combination thereof.

In these implementations, the control system 101 of the agent 102 interacts with a remote policy system 100 that is hosted within a data center with much more computing and other resources than those available on-board the agent 102 to reduce the latency in selecting actions 144, reduce the consumption of the limited power supply of the agent 102 when selecting actions 144, or both.

In some implementations, the policy system 100, the control system 101, or both can expose one or more application programming interfaces (APIs) or other data interfaces that facilitate the control of the agent 102. For example, a user of the agent 102 may use an API made available by the action selection system 100 to provide natural language text sequences 108 characterizing the tasks to be performed by the agent. As another example, the policy system 100 and the control system 101 can interact through an API between the two system, e.g., the control system 101 can use the API to provide the observations 106 to the policy system 100, and the policy system 100 can use the API to provide data specifying the determined actions 144 to the control system 101.

In particular, at each of a plurality of time steps, the policy system 100 and the control system 101 control the agent based on a policy output 142 for the time step generated by a set of learnable modules that have been configured through training to control the agent 102 in response to one or more observations 106 characterizing the environment 104 and natural language text sequences 108 characterizing the task to be performed by the agent 102 that have been received by the policy system 100 at the time step.

In some cases, the one or more observations 106 include an observation image, or a plurality of observation images. For example, the observation images can include images captured by a visual sensor of the agent 102 or by a visual sensor located in the environment 104. The visual sensor can for example be a camera, e.g., a still camera or a video camera, a depth camera, or a lidar sensor.

In other cases, the one or more observations 106 include lower-dimensional data generated from data gathered from other types of sensors that makes observation as the robot interacts with the environment, or from robot hardware. Those sensors can include force sensors, electrical connection sensors, acceleration sensors, audio sensors, gyros, contact sensors, radar sensors, and proximity sensors, e.g., infrared proximity sensors, capacitive proximity sensors, or inductive proximity sensors, to name just a few examples. The robot hardware can include actuators, motors, drivers, grippers, to name just a few examples.

In these cases, the lower-dimensional data can be in the format of a vector (a "state vector"), an array, or any other suitable variable size data structure, that includes numeric values that represent status information for each of one or more entities in the environment 104. For example, the lower-dimensional data can include a corresponding state vector for each object in the environment 104 that represents one or more of a pose, size, or color of the object. For example the pose can be a global or relative pose of the object held by the robot. As another example, the lower-dimensional data can include one or more state vectors for the agent 102, e.g., a state vector that represents a pose (position and orientation) of the robot, a state vector that represents a velocity of each joint of the robot, a state vector that represents a torque, e.g., gravity-compensated torque feedback, of each joint of the robot, a state vector that represents an acceleration of each joint of the robot, or a combined state vector that represents some combination of these of the robot.

In yet other cases, the one or more observations 106 include both an observation image and lower-dimensional data.

In any of these cases, the one or more observations 106 can be obtained by the policy system 100 directly from the sensors or the robot hardware, or through the control system 101 of the agent 102. For example, the control system 101 of the agent 102 obtains, from the sensors or the robot hardware, the one or more observations 106 of the environment 104 at the time step, and then provides the one or more observations 106 to the policy system 100.

In implementations where the policy system 100 is remote from the agent 102, providing the one or more observations 106 to the policy system 100 can include, for example, transmitting data representing the one or more observations 106 over the data communication network that connects the policy system 100 and the control system 101. As another example, providing the one or more observations 106 to the policy system 100 can include providing to the policy system 100 data that specifies a name or a network location (e.g., a Uniform Resource Locator (URL) of a server from which the policy system 100 can obtain the one or more observations 106.

The natural language text sequence 108 may be or include natural language queries that explicitly or implicitly define the task, e.g., by way of asking a question or describing a goal state of the environment. The natural language text sequence 108 may reference the one or more objects in the environment. The natural language text sequence 108 can be received from another agent in the environment 104 or from the control system 101 of the agent 102 at each of the plurality of time steps.

For example, another agent in the environment 104 can speak an instruction and the control system 101 or another system can transcribe it into a natural language text sequence 108, and then provide the transcription at each time step to the policy system 100.

As another example, the control system 101 can receive an instruction, e.g., a text-based input, a selection-based input, or an audio-based input, entered by a user through an input device that specifies the natural language text sequence 108, and then provide the instruction at each time step to the policy system 100. Examples of input devices include a touch screen, a mouse, a keyboard, a voice responsive system, a video camera, a microphone or any other type of device through which a user or another agent in the environment can submit the query.

More specifically, at each of the plurality of time steps, the policy system 100 obtains the one or more observations 106 and the natural language text sequence 108 for the time step, and processes the one or more observations 106 and the natural language text sequence 108 using the encoder subsystem 110 to generate an encoded representation of each of the one or more observations (or "encoded observations" for short), and an encoded representation of the natural language text sequence (or "encoded text" for short).

Generally, the policy system 100 obtains different observations 106 across the plurality of time steps. For example, the observation image, the state vectors, or both included in the observations 106 may differ from one time step to another.

In some cases, the policy system 100 obtains the same natural language text sequence 108 across the plurality of time steps. For example, the natural language text sequence 108 may describe a long-horizon goal for an entire episode, e.g., "sort the objects by colors into corners," "put all the objects in the center," "remove the blue objects from the line," or the like. An episode is generally a time period during which the agent attempts to perform the specified task. It may be defined by a particular number or threshold number of time steps, and/or may continue until some other termination criterion has been satisfied, e.g., a termination signal is received indicating that the task has successfully been performed.

In other cases, the policy system 100 obtains different natural language text sequences 108 across the plurality of time steps. For example, the control system 101 or another system can repeatedly update the natural language text sequence, i.e., generates an updated natural language text sequence, at each of the plurality of time steps, e.g., based on the previous action performed by the agent, the previous state of the environment, or both at a previous time step, and provide the updated natural language text sequence to the policy system 100. In this example, the natural language text sequences 108 may describe an immediate goal, e.g., "move the robot forward," "reach the target location (x, y)," or the like.

As another example, a user may provide an updated natural language text sequence after the episode has begun in response to the user providing an initial natural language text sequence, and thus the policy system 100 obtains the initial natural language text sequence at each of some of the plurality of time steps, and obtains the updated natural language text sequence at each of others of the plurality of time steps.

For each of the one or more observations 106, the encoded observation can be an embedding of the observation 106. An "embedding" as used in this specification is a sequence of one or more vectors of numeric values, e.g., floating point values or other values, each vector having a pre-determined dimensionality. The space of possible vectors having the pre-determined dimensionality is referred to as the "embedding space."

Like the encoded observations, the encoded text can be an embedding of the natural language text sequences 108, i.e., can include a sequence of one or more vectors of numeric values, e.g., floating point values or other values, each vector having a pre-determined dimensionality. In some implementations, the encoded observations and the encoded text reside in the same embedding space, i.e., the constituent vectors of the embeddings of the encoded observations and the encoded text all have the same dimensionality.

The encoder subsystem 110 include any combination of learned modules that allow it to generate the encoded representations and encoded text for each time step respectively from the one or more observations 106 and the natural language text sequences 108 that have been received at the time step. The learned modules may be, but need not be, neural networks. Being "learned" means the parameters of these modules are adjusted during the training of the policy system 100.

In the example of FIG. 1, the encoder subsystem 110 includes one or more encoder neural networks 114, a projector neural network 116, and an embedding matrix 118. When the one or more observations 106 include state vectors or other lower-dimensional data, the one or more encoder neural networks 114 can include a multilayer perceptron (MLP) that receives, as input, the state vectors included in the observations 106 and processes the input to generate, as output, an embedding of each state vector. When the one or more observations 106 include an observation image, the one or more encoder neural networks 114 can include an image encoder neural network that that receives, as input, the observation image and processes the input to generate, as output, an embedding of the observation image.

In some cases, the one or more encoder neural networks 114 includes an image encoder neural network that has a convolutional neural network architecture that includes one or more convolutional layers.

In other cases, the one or more encoder neural networks 114 includes an image encoder neural network that has a Transformer-based architecture that includes one or more attention layers. For example, the image encoder neural network can have a 3D-aware Object Scene Representation Transformer (OSRT) architecture, described in Sajjadi, M. S. M., et al. Object Scene Representation Transformer. NeurIPS, 2022. The OSRT neural network includes a slot mixer decoder that computes an output by applying an attention mechanism over multiple slots that each represent a respective portion of an observation image using one or more query rays having predetermined directions.

In yet other cases, the one or more encoder neural networks 114 includes an image encoder neural network has a vision Transformer (ViT) architecture. For example, the image encoder neural network can have one of the ViT architectures described in Dosovitskiy, A., et al. An image is worth 16×16 words: Transformers for image recognition at scale. arXiv preprint arXiv:2010.11929, 2020; Chen, X., et al. Pali: A jointly-scaled multilingual language-image model. arXiv preprint arXiv:2209.06794, 2022; and Ryoo, M. S., et al. Tokenlearner: What can 8 learned tokens do for images and videos? arXiv preprint arXiv:2106.11297, 2021.

In these cases, the image encoder neural network can be configured to receives, as input, the observation image and an object instance mask, and process the input to generate, as output, the embedding of the observation image. The object instance mask, which can be generated by another learned module, e.g., an image segmentation neural network, of the policy system 100, is a digital representation of an observation image that identifies which portions of the observation image each contain a corresponding target object, e.g., an object referenced in the natural language text sequence 108; and which portions of the observation image do not contain any target object, e.g., and instead merely contain one or more background objects, e.g., the ground or some other background/static object.

In cases where the outputs of these encoder neural networks have a different dimensionality than the inputs of a language model neural network 130 of the policy system 100 the embeddings may need to be projected to have the same dimensionality as the inputs of the language model neural network 130 in order to be subsequently processed by the language model neural network 130. FIG. 1 thus illustrates that the encoder subsystem 110 uses the projector neural network 116 to process, i.e., to project, the embeddings that have been generated as output by the encoder neural network 114. The projected embeddings are then used as the encoded representations of the one or more observations 106.

For example, the projector neural network 116 can be configured as a multilayer perceptron (MLP) or another appropriate network architecture, e.g., that has a single linear projection layer, that receives, as input, the embeddings that have been generated as output by the encoder neural networks 114, and processes the input to generate, as output, an encoded representation of each of the one or more observations 106.

Alternatively, in cases where the embeddings generated by the encoder neural networks 114 all have the same dimensionality, the embeddings can be used as-is as the encoded observations of the one or more observations 106 (thus the encoder subsystem 110 need not include the projector neural network 116).

In some cases, to generate the encoded text, the encoder subsystem 110 generates a one-hot encoded representation of the natural language text sequence 108, i.e., represents the natural language text sequence 108 as a sequence of one-hot encoded vectors, and then maps each one-hot encoded vector to corresponding numerical values in accordance with a predefined mapping. The sequence of one-hot encoded vectors can include a corresponding one-hot encoded vector for each subword included in the natural language text sequence 108. A subword may be a whole word, or may alternatively be a phoneme, syllable, part of a syllable, or any other such portion of the word that includes one or more characters.

In the example of FIG. 1, the predefined mapping is represented as an embedding matrix 118 that has learned values, and thus to generate the encoded text, the encoder subsystem 110 determines a respective product of each one-hot encoded vector in the one-hot encoded representation and the embedding matrix 118. For example, the embedding matrix 118 can have the size of k×|W|, where k is the dimensionality of the embedding space, and |W| is the size of a vocabulary of subwords (the total number of subwords included in the vocabulary).

In other examples, the predefined mapping can be represented as a different learned module. For example, the different learned module can be a text encoder neural network. The text encoder neural network can have any appropriate neural network architecture, e.g., a feedforward architecture, e.g., an encoder-only Transformer neural network, or a recurrent architecture, that allows the neural network to map the natural language text sequence 108 to the encoded text.

At each of the plurality of time steps, the policy system 100 generates, from at least the encoded observation and the encoded text, a sequence of input tokens 112 for the time step. The sequence of input tokens 112 include at least a sequence of observation tokens from the encoded observations and a sequence of text tokens from the encoded text.

Thus the sequence of input tokens 112 is generated from data from two or more modalities. As used in this specification, a "token" (e.g., an image tokens or a text token) is a vector or other ordered collection of numerical values that has a fixed dimensionality, i.e., the number of values in the ordered collection is constant across different tokens.

In some cases, the sequence of input tokens 112 can include additional tokens. When included, these additional tokens can be prepended to, appended to, or interleaved within the sequence of image tokens and the sequence of text tokens.

For example, the additional tokens 112 can include template tokens generated from one or more natural language words or clauses selected from a predetermined template (the words "Given" and "Q:" in FIG. 2 that will be described below are examples of such words). Some implementations of the policy system 100 use these template tokens to convert the sequence of input tokens 112 into a format that is more similar to the format of training input sequences for the tasks, e.g., language modeling tasks or visual-question-answering tasks, on which the language model neural network 130 has been pre-trained, and thereby stabilize the performance of the language model neural network 130.

As another example, the additional tokens 112 can include object referral tokens. To generate the object referral tokens, the policy system 100 can assign an index to each of the one or more objects included in the environment 104, and then generate, as the object referral tokens, an encoded representation of a mapping between the one or more objects and the assigned indices. For example, the mapping can be defined in a natural language to have the following format: "Object 1 is <obj_1>, . . . , Object j is <obj_j>". Some implementations of the policy system 100 use these object referral tokens in situations where the environment 104 includes multiple objects that may not be easily identifiable by natural language in a limited number of words, e.g., when there are multiple blocks on a table of the same color at different locations, allowing the language model neural network 130 to generate high-level plans that accurately reference one or more of these objects.

At each of the plurality of time steps, after generating the sequence of input tokens 112, the policy system 100 processes the sequence of input tokens 112 using a language model neural network 130 to autoregressively generate an output text sequence 132 that includes instructions for the agent in a natural language.

The language model neural network 130 can have any appropriate Transformer-based architecture, e.g., an encoder-only Transformer architecture, an encoder-decoder Transformer architecture, a decoder-only Transformer architecture, or another attention-based architecture, that includes one or more attention layers. As a particular example, the language model neural network 130 can be one of the neural networks described in Chowdhery, A., et al. Palm: Scaling language modeling with pathways. arXiv preprint arXiv: 2204.02311, 2022, Kojima, T., et al. Large language models are zero-shot reasoners. arXiv preprint arXiv:2205.11916, 2022, and Alayrac, J.-B., et al. Flamingo: a visual language model for few-shot learning. arXiv preprint arXiv: 2204.14198, 2022.

In particular, the natural language instructions can define or otherwise specify a high-level plan that includes a sequence of two or more operations that should be executed by the agent 102 at the time step. Generally, the high-level plan defines the operations to be performed by the agent, and the sequential order in which the operations should be performed. Each of these operations can themselves include multiple low-level actions that can be performed by the agent 102.

For example, the output text sequence 132 can be: "open the drawer and remove the ball from the drawer". In this example, the output text sequence 132 defines a first operation of opening the drawer, followed by a second operation of removing the ball from the drawer. In other examples, the output text sequence 132 can define a different sequence of more or fewer operation.

The plan specified by the natural language instructions included the output text sequence 132 are referred to as "high-level" because they are not directly used to control the agent 102. Instead, at each of the plurality of time steps, after generating the output text sequence 132 by using the language model neural network 130, the policy system 100 uses another learned module to map the output text sequence 132 to the one or more low-level actions (or "actions" for short) 144, and then control the agent based on the actions 144.

In the example of FIG. 1, the other learned module is a policy neural network 140. The policy neural network 140 is a neural network that receives, as input, the output text sequence 132 and processes the input to generate, as output, one or more policy outputs 142 that can be used to determine one or more actions 144 to be performed by the agent 104 at the time step, e.g., in response to the observation 106.

For example, the policy neural network 140 can be configured as the goal-conditioned policy neural network described in Lynch, C., et al. Language conditioned imitation learning over unstructured data. arXiv preprint, arXiv: 2005.07648, 2020, or as the Transformer neural network described in Brohan, A., et al. Rt-1: Robotics transformer for real-world control at scale. arXiv preprint, arXiv: 2212.06817, 2022, the entire contents of which are hereby incorporated by reference herein in their entirety.

In other examples, the other learned module may not be a neural network. For example, the learned module can be a regression tree/forest model, decision tree/forest model, support vector machine, or another machine learning model that can map high-level plans to low-level actions.

When configured as a policy neural network, the policy outputs 142 can specify the one or more actions 144 in any appropriate way. For example, each policy output 142 can include a respective numerical probability value for each action in a set of possible actions that can be performed by the agent. In this example, the policy system 100 could determine the action 144 to be performed by the agent 102, e.g., by sampling an action in accordance with the probability values for the actions, or by selecting the action with the highest probability value.

Analogously, each policy output 142 can assign a respective numerical value for each action dimension in a set of action dimensions, e.g., a set of action dimensions for end effector movement, a set of action dimensions for arm movement, a set of action dimensions for base movement, or some combination of these, and the policy system 100 could determine the action 144 to be performed by the agent 102 from the respective numerical values for the set of action dimensions. The numerical values can be assigned either deterministically, e.g., by the policy output 142, or stochastically, e.g., where the policy output 142 parameterizes a distribution for each action dimension from which the numerical value for the action dimension is sampled.

As another example, each policy output 142 can directly define the action to be performed by the agent, e.g., by defining the values of torques that should be applied to the joints of a robotic agent.

Continuing the example above, the policy neural network 140 could generate, from the output text sequence 132 ("open the drawer and remove the ball from the drawer"), one or more corresponding policy outputs 142—and the policy system 100 could determine at least three actions 144 from the corresponding policy outputs 142: a first action of moving a robot arm to position (x, y, z) which is the location of a handle of the drawer, followed by a second action of grasping onto the handle using the end effector, followed by a third action of moving the robot arm in the outward direction with the handle within the grasp of the robot arm.

After having determined the one or more actions 144 to be performed by the agent 102 at the time step, the policy system 100 provides data identifying the determined actions 144 to the control system 101. In implementations where the policy system 100 is remote from the agent 102, providing the data identifying the determined actions 144 can, for example, include transmitting data identifying the determined actions 144 over the data communication network that connects the policy system 100 and the control system 101.

The control system 101 then causes the agent 102 to perform the determined actions 144 at the time step. For example, the control system 101 can do this by generating instructions for the agent 102 that when executed will cause the agent 102 to perform the determined actions 144, by submitting one or more control inputs directly to the appropriate controls of the agent, or by using another appropriate control technique.

In some implementations, the environment 104 is a real-world environment and the agent 102 is a mechanical agent interacting with the real-world environment. For example, the agent may be a robot interacting with the environment to accomplish a goal, e.g., to locate an object of interest in the environment, to move an object of interest to a specified location in the environment, to physically manipulate an object of interest in the environment in a specified way, or to navigate to a specified destination in the environment; or the agent may be an autonomous or semi-autonomous land, air, or sea vehicle navigating through the environment to a specified destination in the environment.

The actions 144 may be control inputs to control a robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions 144 can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example in the case of an autonomous or semi-autonomous land, air, or sea vehicle the actions may include actions to control navigation, e.g., steering, and movement e.g., braking and/or acceleration of the vehicle.

In some implementations the environment 104 is a simulated environment and the agent 102 is implemented as one or more computer programs interacting with the simulated environment. For example, the environment can be a computer simulation of a real-world environment and the agent can be a simulated mechanical agent navigating through the computer simulation.

For example, the simulated environment may be a motion simulation environment, e.g., a driving simulation or a flight simulation, and the agent may be a simulated vehicle navigating through the motion simulation. In these implementations, the actions 144 may be control inputs to control the simulated user or simulated vehicle. As another example, the simulated environment may be a computer simulation of a real-world environment and the agent may be a simulated robot interacting with the computer simulation.

Generally, when the environment 104 is a simulated environment, the actions 144 may include simulated versions of one or more of the previously described actions or types of actions.

In some implementations, the environment 104 is a suitable execution environment, e.g., a runtime environment or an operating system environment, that is implemented on one or more computing devices such as smart phones, tablet computers, wearable devices, automobile systems, standalone personal assistant devices, and so forth, and the agent 102 is a virtual agent (also known as "automated assistant" or "mobile assistant") that may be interacted with by a user through the computing devices. The virtual agent can receive input from the user (e.g., typed or spoken natural language input) and respond with responsive content (e.g., visual and/or audible natural language output). The virtual agent can provide a broad range of functionalities through interactions with various local and/or third-party applications, websites, or other agents. In these implementations, the actions 144 may include any activity or operation that may be performed or initiated by the user on a computing device, e.g., within an application software installed on the computing device.

In some cases, the policy system 100 can be used to control the interactions of the agent with a simulated environment, and the policy system 100 (or another training system) can train the set of learnable modules used to control the agent 102 based on the interactions of the agent 102 (or another agent) with the simulated environment to determine trained values of the parameters of the set of learnable modules. Training the set of learnable modules will be described in more detail below with reference to FIG. 4.

After the set of learnable modules are trained based on the interactions of the agent 102 (or another agent) with a simulated environment, the trained modules can be used by the policy system 100 to control the interactions of a real-world agent with the real-world environment, i.e., to control the agent that was being simulated in the simulated environment.

Training the learnable modules based on interactions of an agent with a simulated environment (i.e., instead of a real-world environment) can avoid wear-and-tear on the agent and can reduce the likelihood that, by performing poorly chosen actions, the agent can damage itself or aspects of its environment.

Figure 2:
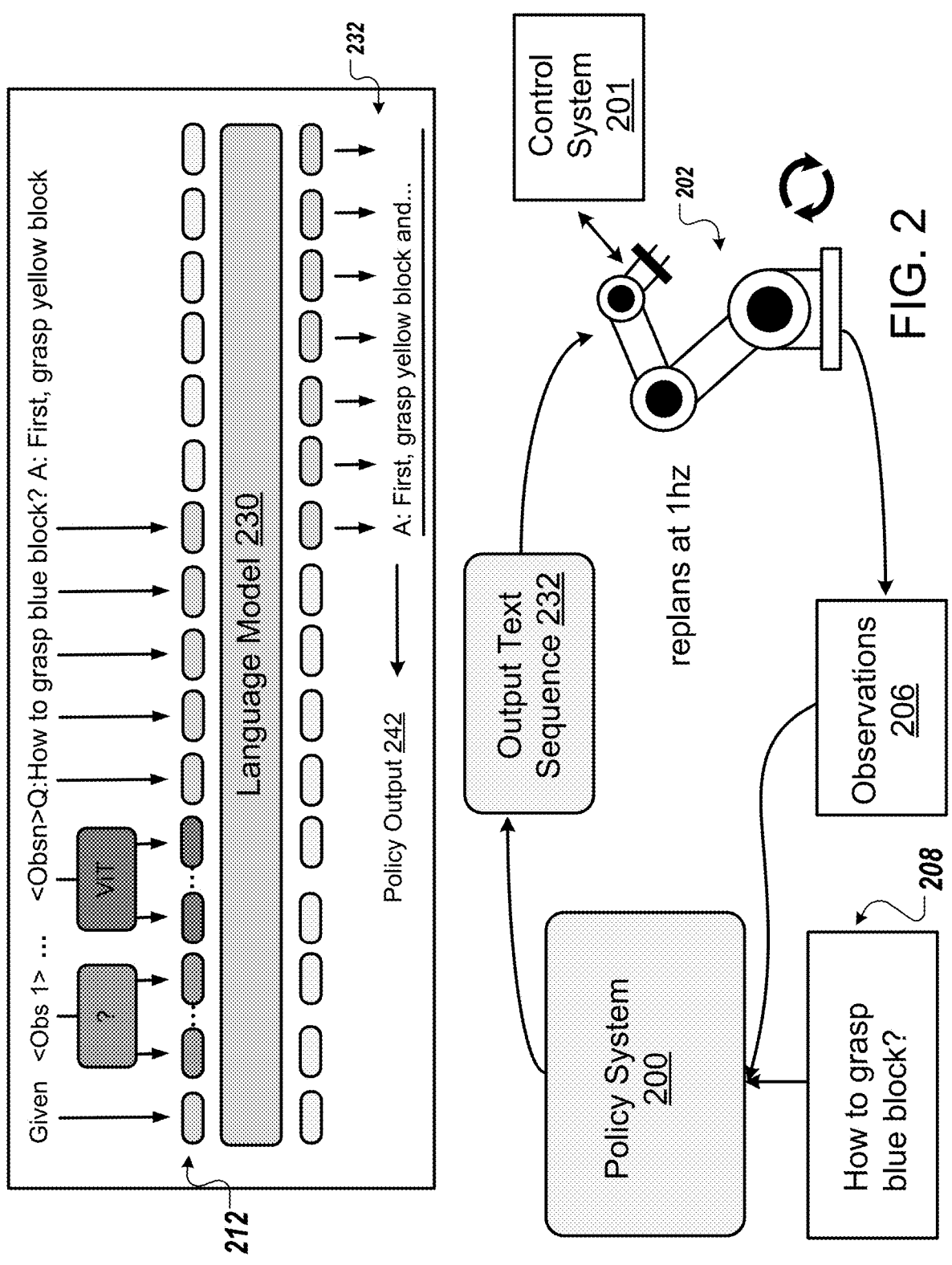
FIG. 2 is an example illustration of controlling an agent by using a policy system.

FIG. 2 is an example illustration of controlling an agent 202 by using a policy system 200 and a control system 201. In FIG. 2, the agent 202 is a robot that has a base, one or more arms, and an end effector. The policy system 200 and the control system 201 can be the same as or similar to the policy system 100 and the control system 101 in FIG. 1, respectively.

The policy system 200 and the control system 201 can control the agent 202 to accomplish a task in an environment by repeatedly performing one iteration of these operations at each of a plurality of time steps to determine one or more actions to be performed by the agent 202, and then causing the agent 202 to perform the one or more determined actions.

At a high level, at each of the plurality of time steps, the operations performed by the policy system 200 include obtaining one or more observations 206 and a natural language text sequence 208 that describes a task to be performed by the agent 202 in the environment, and processing the one or more observations 206 and the natural language text sequence 208 to generate an output text sequence 232 that includes natural language instructions for the agent 202 at the time step.

The natural language instructions can define or otherwise specify a high-level plan that includes a sequence of two or more operations that should be executed by the agent 102 starting from the time step. Each of these operations can themselves include multiple low-level actions by the agent 202.

In particular, when configured to have the architecture described in FIG. 1 which does not rely on human interaction (e.g., human-in-the-loop interaction) or other supervision signals, the policy system 200 can repeatedly performing these operations at a frequency of 1 Hz. That is, the policy system 200 is capable of generating ten potentially different plans (specified by ten output text sequences) for the agent 202 to follow per second, which is higher than the control frequency that would be achieved by many existing robot control systems. Such a high frequency allows the agent 202 to react in a more natural and fluid way, which results in higher precision movements, shorter cycle times, and more reliability when completing tasks.

As illustrated, at each of the plurality of time steps, the policy system 200 obtains a natural language text sequence 208 that implicitly characterizes a task of grasping an object by referencing the object in a question format: "How to grasp blue block?" The policy system 200 processes the natural language text sequence 208 using an embedding matrix to generate an encoded representation of the natural language text sequence ("encoded text") in an embedding space.

In addition, at each of the plurality of time steps, the policy system 200 obtains one or more observations 206, and processes each of the one or more observations 206 using an encoder neural network (configured as a ViT neural network in the example of FIG. 2), and, in some cases, a projector neural network to generate a corresponding encoded representation of each of the one or more observations ("encoded observation") in the embedding space.

At each of the plurality of time steps, the policy system 200 generates, from the encoded observation and the encoded text, a sequence of input tokens 212 for the time step. The sequence of input tokens 212 include a sequence of observation tokens from the encoded observations and a sequence of text tokens from the encoded text at each of a plurality of input positions in an input order.

In the example of FIG. 2, the policy system 200 interleaves the observation tokens of the encoded observations with the text tokens of the encoded text. The sequence of input tokens 212 thus includes multiple segments of the encoded text, separated by the encoded observations:

<Text1><Obs1> . . . <Obsn><Textn> where "<Obs1>" represents a first encoded observation, e.g., an encoded representation of lower-dimensional observation data, "<Obsn>" represents a $n^{th}$ encoded observation, e.g., an encoded representation of an observation image, "<Text1>" represents a first encoded text that corresponds to a first portion of the input text sequence ("Given"), and "<Textn>" represents a first encoded text that corresponds to a $n^{th}$ portion of the input text sequence ("Q: How to grasp blue block?").

In other examples, the sequence of input tokens 212 can include the sequence of observations tokens from the encoded observations and the sequence of text tokens from the encoded text at each the plurality of input positions in a different order, e.g., in a non-interleaved, consecutive order. For example, the sequence of input tokens 212 can include the image tokens followed by the text tokens, or vice versa. The sequence of input tokens 212 can also include additional tokens, e.g., template tokens, object referral tokens, or both as mentioned above.

The policy system 200 then processes the sequence of input tokens 212 using a language model neural network 230 to autoregressively generate an output text sequence 232 that includes natural language instructions for the agent 202. The natural language instructions specify a high-level plan that includes a sequence of two or more operations that should be executed by the agent 202 at the time step. Each of these operations can themselves include multiple low-level actions by the agent 202.

The policy system 200 processes the output text sequence 232 to generate one or more policy outputs 242 that can be used to determine one or more actions to be performed by the agent 202, and subsequently causes the agent 202 to perform the determined actions, e.g., by providing data identifying the determined actions to the control system 201.

In the example of FIG. 2, the natural language instructions are "A: First, grasp yellow block and . . . " and the actions that might be determined from the policy outputs include (i) a first action of moving the robot arm to position (x, y, z) that is a position at a distance d above the yellow block, (ii) a second action of opening a gripper, (iii) a third action of moving the robot arm to position (x, y, z-d) that is a position of the yellow block, and (iv) a fourth action of closing the gripper to grasp onto the yellow block.

The policy system 200 can repeat these operations at the frequency of 1 Hz, or above, until some termination condition has been met, e.g., until it generates a particular output text sequence that include a plan that includes a terminal operation, until a predetermined number of iterations of these operations have been performed, or until a predetermined length of time has lapsed.

FIG. 3 is a flow diagram of an example process 300 for controlling an agent interacting with an environment. For convenience, the process 300 will be described as being performed by a system of one or more computers located in one or more locations. For example, a policy system, e.g., the policy system 100 of FIG. 1, appropriately programmed in accordance with this specification, can perform the process 300.

The system controls the agent to accomplish a task in the environment by repeatedly performing an iteration of the process 300 at each of a plurality of time steps (referred to below as the "current" time step).

The system obtains one or more observations of an environment that includes one or more objects (step 302). In some cases, the one or more observations include an observation image that characterizes a state of the environment at the current time step. For example, the observation image be captured by a visual sensor of the agent or by a visual sensor located in the environment.

In other cases, the one or more observations include lower-dimensional data generated from data gathered from other types of sensors that makes observation as the robot interacts with the environment, or from robot hardware. For example, the lower-dimensional data can include a first state vector that represents one or more of a pose, size, or color of an object included in the environment, and a second state vector that represents a pose of the agent.

In yet other cases, the one or more observations include both an observation image and lower-dimensional data.

Generally, the system obtains different observations across the plurality of time steps. For example, the observation image, the state vectors, or both included in the observations may differ from one time step to another.

The system obtains a natural language text sequence that explicitly or implicitly describes the task to be performed by the agent in the environment, e.g., by way of asking a question or describing a goal state of the environment (step 304). To describe the task, the natural language text sequence may reference the one or more objects in the environment.

In some cases, the system obtains the same natural language text sequence across the plurality of time steps, e.g., when the natural language text sequence describes a long-horizon goal for an entire episode. In other cases, the system obtains different natural language text sequences across the plurality of time steps.

The system generates an encoded representation of the natural language text sequence in an embedding space (step 306). To generate the encoded representation of the input text sequence, the system can represent the natural language text sequence as a sequence of one-hot encoded vectors, and then map each one-hot encoded vector to corresponding numerical values in accordance with a predefined mapping. The sequence of one-hot encoded vectors can include a corresponding one-hot encoded vector for each subword included in the natural language text sequence. For example, the predefined mapping can be represented as an embedding matrix.

The system generates a corresponding encoded representation of each of the one or more observations in the embedding space (step 308). To generate the encoded representations of the one or more observations, the system can process each of the one or more observations using an encoder neural network, and, in some cases, a projector neural network. For example, the encoder neural network can be an image encoder neural network that is configured as a convolutional neural network, a Transformer neural network, or a vision Transformer (ViT) neural network, and the projector neural network can be a multilayer perceptron (MLP).

The system generates a sequence of input tokens that includes text tokens from the encoded representation of the natural language text sequence and observation tokens from the corresponding encoded representation of each observation (step 310). In some cases, the system generates the sequence of input tokens by interleaving the observation tokens with the text tokens. In some other cases, the system generates the sequence of input tokens by prepending the observation tokens to the text tokens, by appending the observation tokens to the text tokens, or by concatenating the sequence of input tokens and the sequence of text tokens in another order. In some cases, the sequence of input tokens can also include additional tokens, e.g., template tokens, object referral tokens, or both.

The system processes the sequence of input tokens using a language model neural network to autoregressively generate an output text sequence that includes natural language instructions for the agent (step 312). The natural language instructions can define or otherwise specify a high-level plan that includes a sequence of two or more operations that should be executed by the agent at the current time step. Generally, the high-level plan defines the operations to be performed by the agent, and the sequential order in which the operations should be performed. Each of these operations can themselves include multiple low-level actions.

The system determines, from the natural language instructions, one or more actions to be performed by the agent at the current time step (step 314). To map the high-level plan defined by the output text sequence to low-level actions, the system can process the output text sequence using a policy neural network to generate one or more policy network outputs, and then determine, in accordance with the one or more policy network outputs, the one or more actions to be performed by the agent.

The system then causes the agent to perform the determined actions, e.g., by directly submitting the control input to the agent or by transmitting instructions or other data, e.g., over a data communication network, to a control system for the agent that will cause the agent to perform the determined actions.

The process 300 can be performed when controlling an agent to perform a task in which the actions that should be performed, e.g., actions that would result in progression towards accomplishing the task, are not known. The process 300 can also be performed as part of selecting actions to be performed by an agent based on processing observations and natural language text sequences derived from a set of training dataset, e.g., observation images the actions in response to which that should be performed by the agent is known, in order to train the set of learnable modules to determine trained values for the parameters of the learnable modules.

Figure 4:
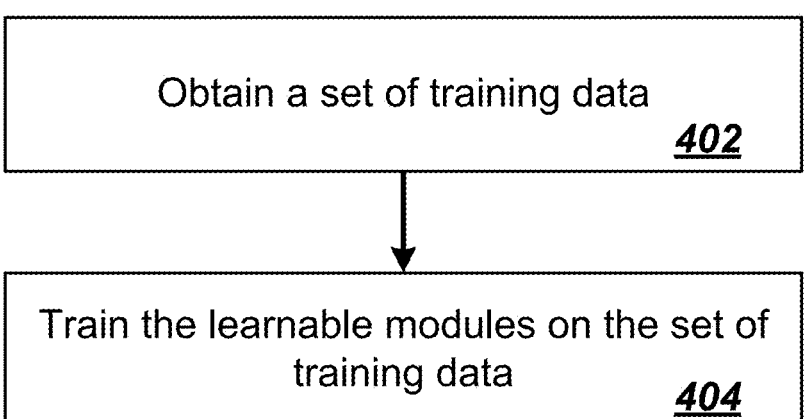
FIG. 4 is a flow diagram of an example process for training learnable modules included in a policy system.

FIG. 4 is a flow diagram of an example process 400 for training learnable modules included in a policy system. For convenience, the process 400 will be described as being performed by a system of one or more computers located in one or more locations. For example, a policy system, e.g., the policy system 100 of FIG. 1, or another training system, appropriately programmed in accordance with this specification, can perform the process 400.

For example, the system can perform process 400 to train the one or more encoder neural networks 114, the projector neural network 116, the embedding matrix 118, and, in some cases, the language model neural network 130, the policy neural network 140, or both included in the policy system 100 of FIG. 1. In some cases, the system train the one or more encoder neural networks 114 and the projector neural network 116 from scratch, e.g., the system can train the neural network 114, 116 from randomly initialized parameters, while the system fine-tunes the embedding matrix 118 and the language model neural network 130 from their pre-trained parameter values.

To train these learnable modules, the system obtains a set of training data (step 402). The set of training data can include training data generated based on the interactions of the agent (or another agent) with an environment.

In one example, the training dataset includes N training examples $$D = \left\{ \left( I^i_{1:u_i}, w^i_{1:L_i}, n_i \right) \right\}^N_{i=1}.$$

Each training example i includes a total of $u_i$ observations of an environment, a natural language text sequence $$w^i_{1:L_i} = (w_1, \ldots, w_L)$$

that includes natural language instructions that specifies a high-level plan for an agent, where $w_i$ represents one of the tokens that make up the natural language text sequence, and an index $n_i$.

The system trains the learnable modules included in the policy system on the set of training data (step 404). To train the learnable modules, the system selects training examples i from the training dataset and, for each training example i selected from the training dataset, processing a training input that includes the $u_i$ observations and a prefix portion of the natural language text sequence $$w^i_{n_i+1:L_1}.$$

(identified by the index $n_i$) using the encoder neural networks, the projector neural network, and the language model neural network, to generate a prediction of the remaining portion of the natural language text sequence $$w^i_{1:n_i}$$

For example, step 404 can involve performing multiple iterations of some or all steps in the process 300.

The system updates the values for the parameters of the neural networks based on using a machine learning training technique, e.g., a gradient descent with backpropagation training technique that uses a suitable optimizer, e.g., stochastic gradient descent, RMSprop, or Adam optimizer, to optimize an objective function, e.g., a cross-entropy objective function that is specific to a next token prediction task.

For each training example i selected from the training dataset, the next token prediction task is a task that requires predicting, given a prefix portion of the natural language text sequence $$w^i_{1:n_i},$$

the remaining portion of the natural language text sequence $$w^i_{n_i+1:L_1}$$

that follows the prefix portion in the training example i.

In some cases, the system trains the learnable modules from scratch, e.g., from randomly initialized parameters, while in other cases, the system trains at least some of the learnable modules from their pre-trained parameter values. For example, one of the encoder neural networks can have been pre-trained on object-centric 3D scene representation learning tasks described in Sajjadi, M. S. M., et al. Object Scene Representation Transformer. NeurIPS, 2022.

As another example, the policy neural network can have been pre-trained based on optimizing a language conditioned imitation learning objective using unstructured and/or unlabeled demonstration data (i.e., with no language or task labels) described in Lynch, C., et al. Language conditioned imitation learning over unstructured data. arXiv preprint, arXiv:2005.07648, 2020.

As yet another example, the language model neural network can have been pre-trained on one or more of the language modeling tasks described in Chowdhery, A., et al. Palm: Scaling language modeling with pathways. arXiv preprint arXiv:2204.02311, 2022. In this example, pre-training the language model neural network can also involve learning the pre-trained values of the embedding matrix.

Moreover, during training, the system can incorporate any number of techniques to improve the speed, the effectiveness, or both of the training process. For example, instead of updating the parameters of all of the learnable modules, the system only updates the parameters of some of the learnable modules and holds the parameters of others of the learnable modules fixed during the training. For example, when the language model neural network has been pre-trained on language modeling tasks, the system can hold the pre-trained parameter values of the language model neural network and the policy neural network fixed, and only updates the parameter values of the one or more encoder neural networks and the projector neural network.

As another example, in addition to training the learnable modules on agent control tasks, the system also trains the learnable modules on related tasks that similarly requires a multi-model input, but that do not involve controlling an agent. For example, the set of training data can also include training data specific to embodied reasoning tasks, visual question answering tasks, image captioning tasks, and so on. Co-training across tasks on a variety of diverse training data can improve the performance of the system on individual tasks, e.g., by virtue of transferring knowledge from visual-language domain into agent control domain.

While this specification generally describes that the task is an agent control task that involves controlling an agent in an environment, the language model neural network, the encoder neural networks, and the projection neural network can be similarly configured to perform any of a broader range of multi-modal machine learning tasks. A multi-modal machine learning task is a task that requires the neural network to process an input that includes data from two or more modalities in order to generate the output for the task.

Specifically, in some cases, the sequence of input tokens from the user may be a question or other query about the environment, and does not require the robot to take any action. In these cases, rather than outputting a text sequence that defines a high-level plan, the output text sequence generated by the language model neural network can be a response to the query. Examples of such queries include queries about open-vocabulary image classification, open-vocabulary object detection, image captioning, text-based image search, image-based retrieval, visual question answering, and so on.

In some cases, the sequence of input tokens from the user represents a sequence of health data and the output text sequence may comprise a sequence of predicted treatment. Then the input tokens may represent any aspect of the health of a patient e.g. data from blood and other medical tests on the patient and/or other patient data; and the output text sequence may represent diagnostic information e.g. relating to a disease status of the patient and/or relating to suggested treatments for the patient, and/or relating to a likelihood of an adverse health event for the patient.

Figure 5A:
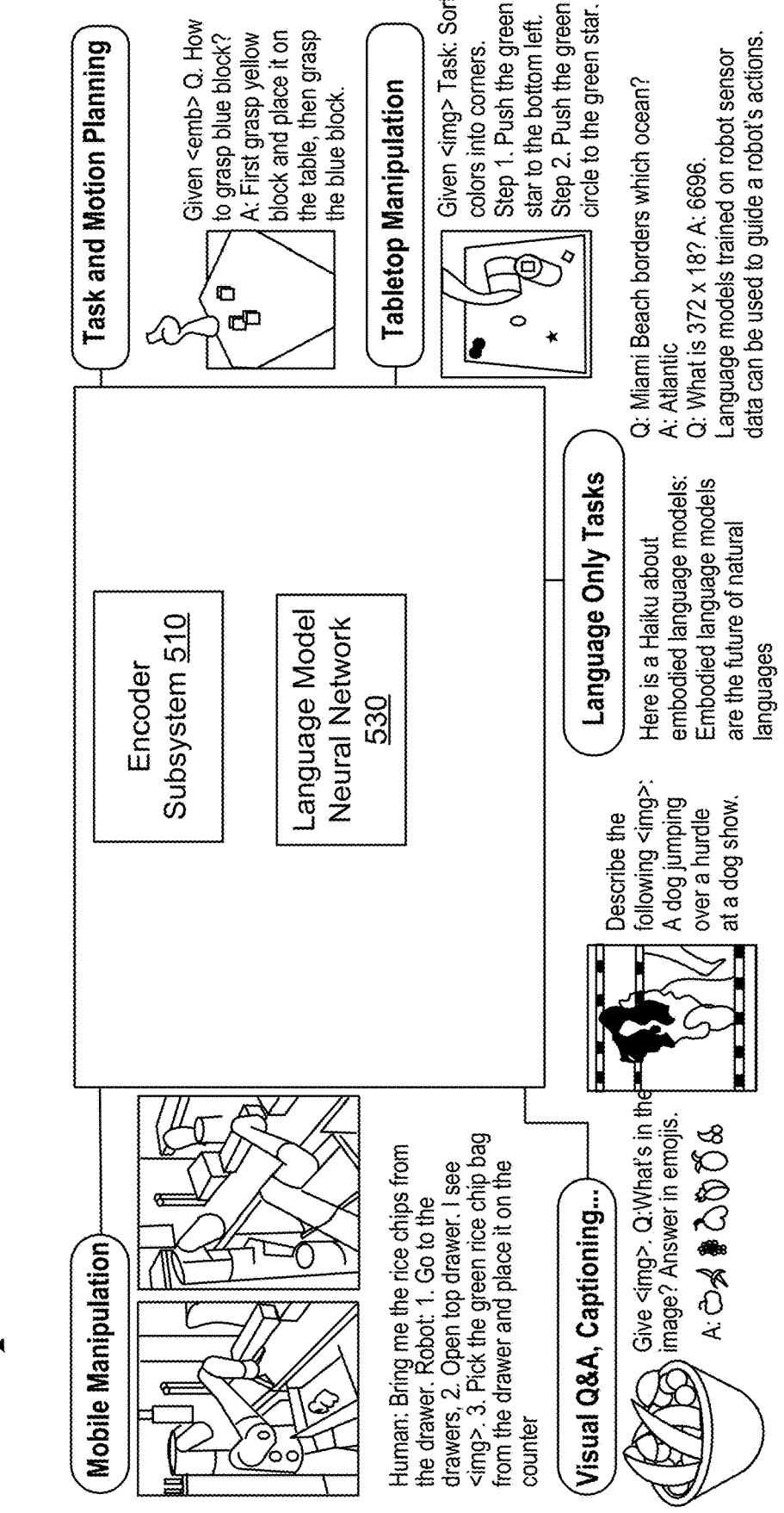
FIG. 5A is an example illustration of tasks that can be performed by an encoder subsystem and a language model neural network.

FIG. 5A is an illustration of example tasks that can be performed by an encoder subsystem 510 and a language model neural network 530. FIG. 5B is an illustration of additional example tasks that can be performed by the encoder subsystem 510 and the language model neural network 530. The encoder subsystem 510 and the language model neural network 530 can be the same as or similar to the encoder subsystem 110 and a language model neural network 130 in FIG. 1, respectively.

For example, FIG. 5B illustrates that the encoder subsystem 510 and the language model neural network 530 can be configured to perform a robot visual perception, dialogue, and planning task, wherein the observation includes an image and the natural language text sequence includes a description of a task to be performed by a robot by interacting with the environment ("Use all of the ingredients you see to make a cake batter"), and the output text sequence specifies a high-level plan that includes a sequence of two or more operations ("1. crack egg. 2. put egg in bowl . . . ") that can be performed by the robot for achieving the task.

As another example, FIG. 5B illustrates that the encoder subsystem 510 and the language model neural network 530 can be configured to perform a robot initiative task, wherein the observation includes an image and the natural language text sequence includes a question about an environment characterized by the image ("If a robot wanted to be useful here, what steps should it take?"), and the output text sequence specifies a high-level plan that includes a sequence of two or more operations ("clean table . . . pick up trash . . . ") that can be performed by a robot within the environment.

As another example, FIG. 5B illustrates that the encoder subsystem 510 and the language model neural network 530 can be configured to perform a physical prediction task, wherein the observation includes an image characterizing an object and the natural language text sequence includes a question about a physical state or condition of the object characterized by the image ("What will the robot do next?"), and the output text sequence includes an answer to the question ("fall").

As another example, FIG. 5B illustrates that the encoder subsystem 510 and the language model neural network 530 can be configured to perform a multi-image relationship reasoning task, wherein the observation includes two or more images characterizing different objects (a coffee pot and a stove), and the natural language text sequence includes a question about a relationship, e.g., a spatial, temporal, or semantic relationship, between the different objects characterized by the two or more images, and the output text sequence includes an answer to the question ("a stove top with a pot on it").

Advantageously, FIG. 5B illustrates that the encoder subsystem 510 and the language model neural network 530 has the generalization capability to adapt, e.g., through one-shot or zero-shot learning, to tasks, e.g., multi-modal chain-of-thought tasks and multi-image relationship reasoning tasks, that involve novel objects that were previously unseen during the training of the system. This avoids the need to spend additional computing resources, power resources, or both to train separate neural networks corresponding to different tasks.

Figure 5C:
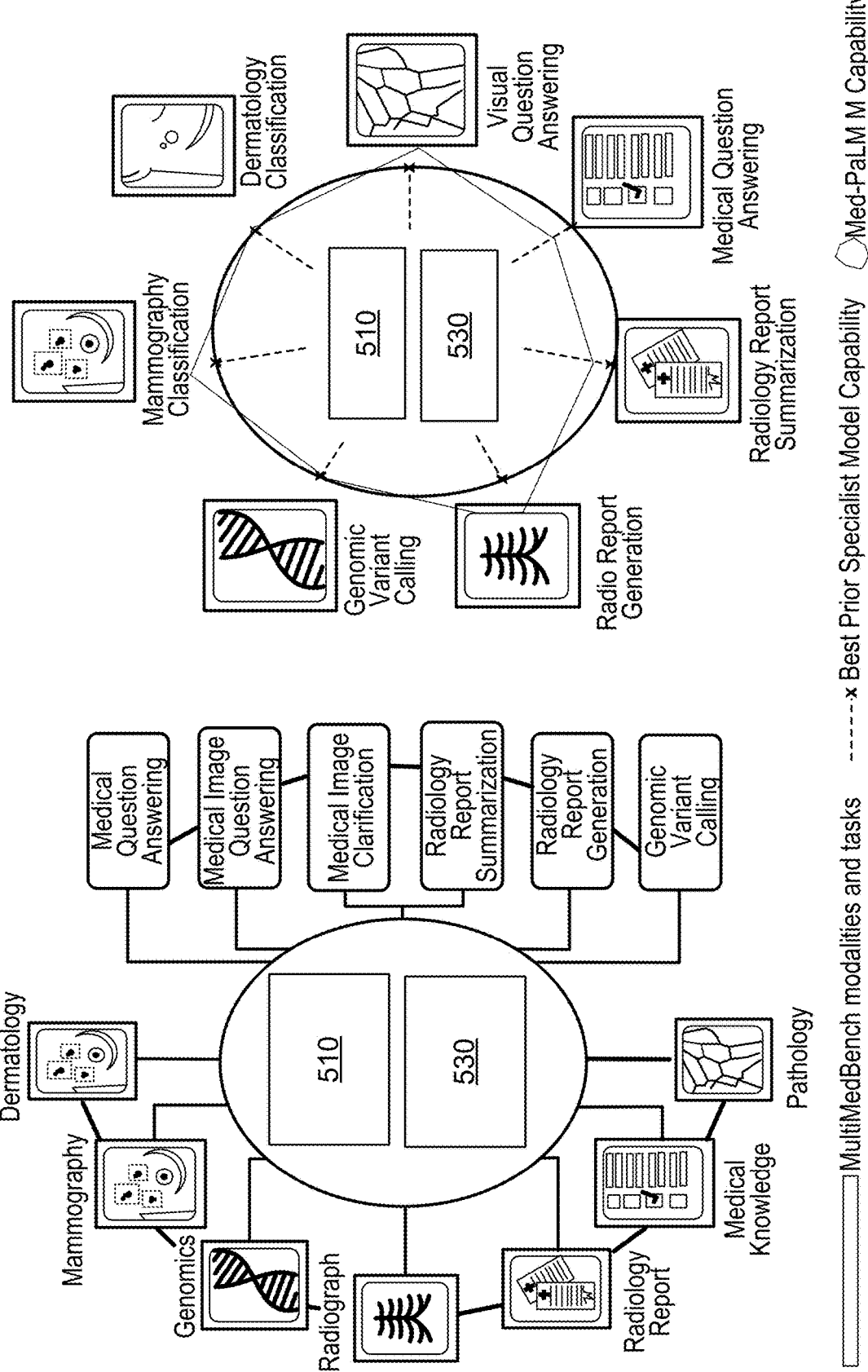
FIG. 5C is an example illustration of tasks in a medical domain that can be performed by an encoder subsystem and a language model neural network.

FIG. 5C is an example illustration of tasks in a medical domain that can be performed by the encoder subsystem 510 and the language model neural network 530. The encoder subsystem 510 and the language model neural network 530 can be the same as or similar to the encoder subsystem 110 and a language model neural network 130 in FIG. 1, respectively.

For example, the encoder subsystem 510 and the language model neural network 530 can be configured to process a medical image depicting a region of the body of a patient to generate a final classification output which classifies the medical image into a respective class of a plurality of classes.

In this example, the patient may be a human or an animal. The region of the body of the patient depicted by the medical image may be, for example, the tissue of an eye, a breast, a prostate, a brain, or the whole body. The medical image may be a two-dimensional (2D) image (e.g., represented as a 2D array of pixels), a three dimensional (3D) image (e.g., represented as a 3D array of voxels), or a higher dimensional image. The medical image can be acquired by a medical imaging scanner of any modality, for example, an optical coherence tomography (OCT) scanner, a magnetic resonance imaging (MRI) scanner, an X-ray scanner, a computed tomography (CT) scanner, an ultrasound (US) scanner, or a photographic scanner.

In some implementations, each respective class of the plurality of classes may represent a particular type and/or variant of a medical condition. For example, each respective class of the plurality of classes may represent a particular dermatological condition (e.g., eczema, lupus, melasma, etc.). In other examples, the plurality of classes may correspond to various other medical conditions that may be represented by and/or diagnosed based on, for example, chest X-rays, brain computed tomography (CT) scans, fundus images, and/or other types of representations of various anatomical parts.

In some implementations, each respective class of the plurality of classes may represent a respective referral score for each of multiple possible clinical referral decisions for the patient. Each referral score may represent a predicted likelihood that the corresponding referral decision is the most appropriate referral decision for the patient, conditioned on the segmentation map of the medical image of the patient. A clinical referral decision may reflect an urgency with which the patient should receive further medical attention (e.g., by a specialist physician). Examples of clinical referral decisions include: observation only, routine, semi-urgent, and urgent.

In some implementations, each respective class of the plurality of classes may represent a respective condition score for each of multiple medical conditions. Each condition score may represent a predicted likelihood that the patient has the medical condition, conditioned on the segmentation map of the medical image of the patient. For example, if the medical image is an OCT image of the patient's eye, then the medical conditions may include: normal condition, macular retinal edema (MRO), choroidal neovascularization (CNV), and geographic atrophy, amongst others.

In some implementations, each respective class of the plurality of classes may represent a respective progression score for each of multiple condition states. Each progression score may represent a predicted likelihood that a state of a corresponding medical condition will progress to the condition state at a particular future time, conditioned on the segmentation map of the medical image of the patient. For example, the condition states include: a stable state, a slow progression state, or a rapid progression state.

In some implementations, each respective class of the plurality of classes may represent a respective treatment score for each of multiple medical treatments. Each treatment score may represent a predicted likelihood that the medical treatment is the best medical treatment for the patient, conditioned on the segmentation map of the medical image of the patient, more particularly the treatment that is relatively the best amongst a set of treatments. For example, the medical treatments may include: no treatment, surgery, or the administration of various different drugs.

As another example, the task can be a medical text processing task, where the input is a sequence of medical report or another sequence derived from electronic health record data, and the output is another sequence of text, e.g., a completion of the medical report, a response to a question posed in the medical report, or a summary of the medical report that is shorter than the medical report (but summarizes the medical report, i.e., represents the most important or relevant information within the medical report).

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the tasks in the medical domain include a multi-modal processing task that requires processing multi-modal data. In general, multi-modal data is a combination of two or more different types of data, e.g., both image data and text data.

For example, the task can be a medical visual question answering task that requires generating an answer to a question that is posed about a medical image. As another example, the task can be a medical report generation task that requires generating a text report that characterizes a medical image. The medical image can by any one of the example medical images mentioned above.

The outputs for any of these tasks in the medical domain can be generated by the language model neural network 530, e.g., as sequences of text tokens, or as probability distributions generated from probabilities assigned to a predetermined set of tokens.

FIG. 5D is an example illustration of performing a medical visual question answering task by the encoder subsystem 510 and the language model neural network 530. As illustrated, the encoder subsystem 510 receives a natural language text sequence 552 and an observation 554 that includes a chest X-ray image. The natural language text sequence 552 includes a question that is posed about the chest X-ray image included in the observation 554: "Can you write me a report analyzing this chest-X-ray?"

In response, the encoder subsystem 510 generates a sequence of input tokens that includes the encoded representation of the text sequence and the encoded representation of the chest X-ray image—and the language model neural network 530 processes the sequence of input tokens to generate an output text sequence 556 that is a response to the question: "

Findings:

Devices: None.

Lungs: No pneumothorax. No substantial pleural effusion. Lungs appear clear.

Cardiomediastinal: Normal hear size. Mediastinal contours within normal limits.

Other: No acute skeletal abnormality.

Impression:

No active disease seen in chest."

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations.

Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for controlling a robot to perform a task, the method comprising:

receiving one or more observations that characterize a state of an environment at a time step, wherein the environment that comprises one or more objects;

receiving an input text sequence that describes the task to be performed by the robot in the environment and that references the one or more objects in the environment;

generating an encoded representation of the input text sequence in an embedding space;

generating a corresponding encoded representation of each of the one or more observations in the embedding space;

generating a sequence of input tokens that comprises the encoded representation of the input text sequence and the corresponding encoded representation of each observation;

processing the sequence of input tokens using a language model neural network to autoregressively generate an output text sequence that specifies a high-level plan for the robot at the time step, wherein the high-level plan at the time step defines a plurality of operations to be performed by the robot and an order of performance of the plurality of operations by the robot in response to the one or more observations that characterize the state of the environment at the time step;

processing at least the output text sequence using a policy neural network to map the high-level plan to one or more actions to be performed by robot hardware of the robot in response to the one or more observations that characterize the state of the environment at the time step; and controlling the robot to perform the task based on the one or more actions.

2. The method of claim 1, wherein receiving the one or more observations of the environment comprises:

receiving a first state vector that represents one or more of a pose, size, or color of an object; and receiving a second state vector that represents a pose of the robot.

3. The method of claim 1, wherein receiving the one or more observations of the environment comprises:

receiving an image that characterizes the environment.

4. The method of claim 1, wherein generating the corresponding encoded representation of each of the one or more observations comprises:

processing each of the one or more observations using an encoder neural network, a projector neural network, or both.

5. The method of claim 4, wherein the encoder neural network is configured as an image encoder neural network, wherein the projector neural network is configured as a multilayer perceptron (MLP), and wherein processing each of the one or more observations comprises:

processing an input comprising an image using the image encoder neural network to generate an image encoder embedding of the image; and processing the image encoder embedding of the image using the MLP to generate an encoded representation of the image.

6. The method of claim 5, wherein the image encoder neural network is configured as a convolutional neural network, a Transformer neural network, or a vision Transformer (ViT) neural network.

7. The method of claim 5, wherein the input comprises the image and an object instance mask that identifies different portions of the image as each containing a corresponding object.

8. The method of claim 6, wherein the image encoder neural network comprises a slot mixer decoder that computes an output by applying an attention mechanism over multiple slots that each represent a respective portion of the image using one or more query rays having predetermined directions.

9. The method of claim 1, wherein the corresponding encoded representation of each observation is interleaved in between the encoded representation of the input text sequence in the sequence of input tokens.

10. The method of claim 1, wherein generating the sequence of input tokens comprises:

assigning an index to each of the one or more objects included in the environment;

generating an encoded representation of a prefix that defines a mapping between the one or more objects and the assigned indices; and generating a sequence of input tokens that comprises the prefix.

11. The method of claim 1, wherein generating the encoded representation of the input text sequence comprises:

determining a respective product of each one-het encoded vector in an ene het encoded representation of the input text sequence and an embedding matrix having values that have been learned jointly with the language model neural network.

12. The method of claim 1, wherein the robot hardware of the robot comprises an actuator, a motor, a driver, or a gripper.

13. The method of claim 1, wherein processing at least the output text sequence using the policy neural network to map the high-level plan to the one or more actions to be performed by the robot hardware of the robot comprises:

processing at least the high-level plan natural language instructions using the policy neural network to generate one or more policy network outputs; and selecting, in accordance with the one or more policy network outputs, the one or more actions to be performed by the robot hardware of the robot from a space of possible actions.

14. A system comprising one or more computers and one or more storage devices storing instructions that are operable, when executed by the one or more computers, to cause the one or more computers to perform operations for controlling a robot to perform a task, the operations comprising:

receiving one or more observations that characterize a state of an environment at a time step, wherein the environment that-comprises one or more objects;

receiving an input text sequence that describes the task to be performed by the robot in the environment and that references the one or more objects in the environment;

generating an encoded representation of the input text sequence in an embedding space;

generating a corresponding encoded representation of each of the one or more observations in the embedding space;

generating a sequence of input tokens that comprises the encoded representation of the input text sequence and the corresponding encoded representation of each observation;

processing the sequence of input tokens using a language model neural network to autoregressively generate an output text sequence that specifies a high-level plan for the robot at the time step, wherein the high-level plan at the time step defines a plurality of operations to be performed by the robot and an order of performance of the plurality of operations by the robot in response to the one or more observations that characterize the state of the environment at the time step;

processing at least the output text sequence using a policy neural network to map the high-level plan to one or more actions to be performed by robot hardware of the robot in response to the one or more observations that characterize the state of the environment at the time step; and controlling the robot to perform the task based on the one or more actions.

15. The system of claim 14, wherein receiving the one or more observations of the environment comprises:

receiving a first state vector that represents one or more of a pose, size, or color of an object; and receiving a second state vector that represents a pose of the robot.

16. The system of claim 14, wherein receiving the one or more observations of the environment comprises:

receiving an image that characterizes the environment.

17. The system of claim 14, wherein generating the corresponding encoded representation of each of the one or more observations comprises:

processing each of the one or more observations using an encoder neural network, a projector neural network, or both.

18. The system of claim 17, wherein the encoder neural network is configured as an image encoder neural network, wherein the projector neural network is configured as a multilayer perceptron (MLP), and wherein processing each of the one or more observations comprises:

processing an input comprising an image using the image encoder neural network to generate an image encoder embedding of the image; and processing the image encoder embedding of the image using the MLP to generate an encoded representation of the image.

19. The system of claim 18, wherein the image encoder neural network is configured as a convolutional neural network, a Transformer neural network, or a vision Transformer (ViT) neural network.

20. A non-transitory computer storage medium encoded with instructions that, when executed by one or more computers, cause the one or more computers to perform operations for controlling a robot to perform a task, the operations comprising:

receiving one or more observations that characterize a state of an environment at a time step, wherein the environment that comprises one or more objects;

receiving an input text sequence that describes the task to be performed by the robot in the environment and that references the one or more objects in the environment;

generating an encoded representation of the input text sequence in an embedding space;

generating a corresponding encoded representation of each of the one or more observations in the embedding space;

generating a sequence of input tokens that comprises the encoded representation of the input text sequence and the corresponding encoded representation of each observation;

processing the sequence of input tokens using a language model neural network to autoregressively generate an output text sequence that specifies a high-level plan for the robot at the time step, wherein the high-level plan at the time step defines a plurality of operations to be performed by the robot and an order of performance of the plurality of operations by the robot in response to the one or more observations that characterize the state of the environment at the time step;

processing at least the output text sequence using a policy neural network to map the high-level plan to one or more actions to be performed by robot hardware of the robot in response to the one or more observations that characterize the state of the environment at the time step; and controlling the robot to perform the task based on the one or more actions.

\* \* \* \* \*